(12) United States Patent
Gao et al.

(10) Patent No.: US 11,329,783 B2
(45) Date of Patent: May 10, 2022

(54) METHOD AND DEVICE FOR PERFORMING COMMUNICATION

(71) Applicant: NEC CORPORATION, Tokyo (JP)

(72) Inventors: Yukai Gao, Beijing (CN); Chuangxin Jiang, Beijing (CN); Zhennian Sun, Beijing (CN); Lei Jiang, Beijing (CN); Hongmei Liu, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/319,004

(22) PCT Filed: Jul. 19, 2016

(86) PCT No.: PCT/CN2016/090462
§ 371 (c)(1),
(2) Date: Jan. 18, 2019

(87) PCT Pub. No.: WO2018/014192
PCT Pub. Date: Jan. 25, 2018

(65) Prior Publication Data
US 2019/0268120 A1    Aug. 29, 2019

(51) Int. Cl.
*H04L 5/00*    (2006.01)
*H04L 1/00*    (2006.01)
(Continued)

(52) U.S. Cl.
CPC .......... *H04L 5/0051* (2013.01); *H04L 1/0061* (2013.01); *H04L 1/0069* (2013.01);
(Continued)

(58) Field of Classification Search
CPC ... H04L 5/0055; H04L 5/0051; H04L 5/0082; H04L 5/0048
See application file for complete search history.

(56) References Cited

U.S. PATENT DOCUMENTS

| 2006/0034241 | A1 | 2/2006 | Czaja et al. |
| 2011/0081875 | A1* | 4/2011 | Imamura ................ H04B 1/04 455/101 |

(Continued)

FOREIGN PATENT DOCUMENTS

| CN | 101141756 A | 3/2008 |
| CN | 101926112 A | 12/2010 |

(Continued)

OTHER PUBLICATIONS

International Search Report for PCT/CN2016/090462 dated Mar. 17, 2017 [PCT/ISA/210].

(Continued)

*Primary Examiner* — Redentor Pasia
(74) *Attorney, Agent, or Firm* — Sughrue Mion, PLLC

(57) ABSTRACT

Embodiments of the disclosure provide a method and device for performing communication. The method comprises: determining a target transmission pattern from a set of candidate transmission patterns, wherein the target transmission pattern is indicated by a signal including one or more of: a reference signal, a signal for performing CRC, and a feedback signal; and performing communication between a network device and a terminal device by using the target transmission pattern.

20 Claims, 16 Drawing Sheets

(51) Int. Cl.
*H04L 27/26* (2006.01)
*H04L 1/18* (2006.01)
*H04L 1/12* (2006.01)
*H04L 1/16* (2006.01)

(52) U.S. Cl.
CPC .............. *H04L 1/12* (2013.01); *H04L 1/1657* (2013.01); *H04L 1/1854* (2013.01); *H04L 1/1861* (2013.01); *H04L 5/0048* (2013.01); *H04L 5/0055* (2013.01); *H04L 5/0082* (2013.01); *H04L 5/0094* (2013.01); *H04L 27/2607* (2013.01); *H04L 5/0007* (2013.01)

(56) References Cited

U.S. PATENT DOCUMENTS

| | | | | |
|---|---|---|---|---|
| 2011/0085513 | A1* | 4/2011 | Chen | H04W 72/042 370/330 |
| 2012/0039325 | A1* | 2/2012 | Buckley | H04W 48/12 370/338 |
| 2012/0155338 | A1* | 6/2012 | Noh | H04L 5/0023 370/280 |
| 2012/0201187 | A1* | 8/2012 | Koo | H04L 1/0027 370/312 |
| 2012/0329400 | A1* | 12/2012 | Seo | H04L 5/00 455/63.1 |
| 2013/0102342 | A1* | 4/2013 | Tesanovic | H04B 7/0623 455/507 |
| 2013/0128851 | A1* | 5/2013 | Earnshaw | H04L 1/1812 370/329 |
| 2013/0136095 | A1* | 5/2013 | Nishio | H04W 72/042 370/329 |
| 2014/0119332 | A1* | 5/2014 | Kim | H04W 52/58 370/330 |
| 2014/0226636 | A1* | 8/2014 | Xu | H04L 5/0053 370/336 |
| 2015/0124783 | A1* | 5/2015 | Li | H04W 72/1273 370/336 |
| 2015/0230211 | A1* | 8/2015 | You | H04W 72/04 370/330 |
| 2016/0050001 | A1* | 2/2016 | Kang | H04W 72/0406 370/329 |
| 2016/0286404 | A1* | 9/2016 | Rico Alvarino | H04L 5/0048 |
| 2017/0005711 | A1* | 1/2017 | Yu | H04B 7/0617 |
| 2017/0324528 | A1* | 11/2017 | Rico Alvarino | H04L 5/0048 |
| 2017/0366311 | A1* | 12/2017 | Iyer | H04B 7/0482 |
| 2018/0376497 | A1* | 12/2018 | You | H04L 5/0053 |

FOREIGN PATENT DOCUMENTS

| | | |
|---|---|---|
| CN | 102014506 A | 4/2011 |
| CN | 102036301 A | 4/2011 |
| CN | 102388558 A | 3/2012 |
| CN | 102550122 A | 7/2012 |
| CN | 102687417 A | 9/2012 |
| CN | 104125186 A | 10/2014 |
| CN | 105519181 A | 4/2016 |
| ER | 2 296 301 A1 | 3/2011 |
| JP | 2010206403 A | 9/2010 |
| JP | 2013516881 A | 5/2013 |
| JP | 2014057138 A | 3/2014 |
| WO | 2009/157487 A1 | 12/2009 |
| WO | 2011083431 A2 | 7/2011 |
| WO | 2014202556 A1 | 12/2014 |
| WO | 2015/154283 A1 | 10/2015 |
| WO | 2016/062138 A1 | 4/2016 |

OTHER PUBLICATIONS

Communication dated Aug. 25, 2020, from the Japanese Patent Office in Application No. 2019-502174.
Communication dated Jan. 26, 2021, from the Japanese Patent Office in Application No. 2019-502174.
Office Action dated Jun. 30, 2021 in Chinese Application No. 201680087781.X.
Communication dated Feb. 14, 2022 from the Chinese Patent Office in Chinese Application No. 201680087781.X.
Chinese Search Report dated Feb. 14, 2022 in Chinese Application No. 201680087781.X.

* cited by examiner

METHOD AND DEVICE FOR PERFORMING COMMUNICATION

FIELD OF THE INVENTION

Embodiments of the present disclosure generally relate to communication techniques. More particularly, embodiments of the present disclosure relate to a method and device for performing communication.

BACKGROUND OF THE INVENTION

Communication technologies are developed for improving performance of a communication system to enable higher throughput and/or speed communication, such as enhanced mobile broadband communication, massive machine-type-communication, ultra-reliable and low latency communication, and so on. These communications are generally performed by network devices and terminal devices according to predetermined transmission patterns.

In a communication system, a transmission pattern generally refers to settings regarding resources of time domain and/or frequency domain. For instance, a transmission pattern may correspond to one or more subframes or a certain number of symbols in time domain, and may correspond to one or more subcarriers in frequency domain. With the development of communication technologies, the transmission pattern indication needs to be quickly, abruptly and efficiently known by the network device and terminal device.

Conventionally, an indication about a transmission pattern may be included in downlink control information or higher layer signals. Thus, the network device and/or the terminal device may have to decode and allocate resource for such information. As such, a lot of time may be consumed to obtain the indication, which is impermissible for some ultra-reliable and low latency communications.

Therefore, there is a need for a scheme for performing communication to indicate the transmission pattern in a more efficient way.

SUMMARY OF THE INVENTION

The present disclosure proposes a solution for performing communication to indicate the transmission pattern in a more efficient way.

According to a first aspect of embodiments of the present disclosure, embodiments of the disclosure provide a method performed by a device. The device determines a target transmission pattern from a set of candidate transmission patterns. The target transmission pattern is indicated by a signal including one or more of: a reference signal, a signal for performing Cyclic Redundancy Check (CRC), and a feedback signal. Then, communication between a network device and a terminal device is performed by using the target transmission pattern.

According to a second aspect of embodiments of the present disclosure, embodiments of the disclosure provide a device for performing communication. The device comprises: a controller configured to determining a target transmission pattern from a set of candidate transmission patterns, wherein the target transmission pattern is indicated by a signal including one or more of: a reference signal, a signal for performing CRC, and a feedback signal; and a transceiver configured to perform communication between a network device and a terminal device by using the target transmission pattern.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
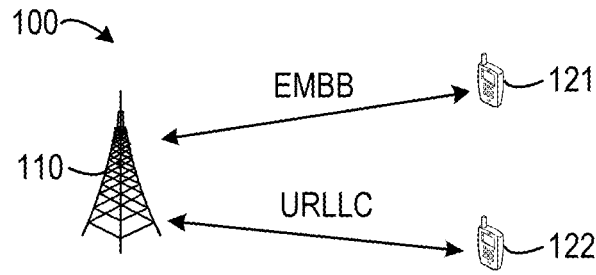
FIG. 1 illustrates a schematic diagram of a communication system 100 according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

Now some exemplary embodiments of the present disclosure will be described below with reference to the figures. Reference is first made to FIG. 1, which illustrates schematic diagram of a communication system 100 according to embodiments of the present disclosure.

In the communication system 100, there illustrate a network device (also referred to as BS hereafter) 110 that communicates with two terminal devices (also referred to as UEs hereafter) 121 and 122 by using a certain transmission pattern.

In the context of the present disclosure, the term "transmission pattern" refers to settings regarding resource in time domain and/or frequency domain. For instance, a transmission pattern may correspond to one or more subframes or a certain number of symbols in time domain, and may correspond to one or more subcarriers in frequency domain.

A transmission pattern may be fully used for DL transmission or may be fully used for UL transmission. Alternatively, in some embodiments, a transmission pattern may be used for both DL and UL transmissions. Thus, in embodiments of the present disclosure, a transmission pattern may contain a DL transmission part and/or a UL transmission part a transmission pattern may contain a DL transmission part and/or a UL transmission part. In some embodiments, a transmission pattern may differ from another in terms of time durations and/or subcarrier spaces of the respective DL transmission parts and/or the UL transmission parts.

In embodiments of the present disclosure, transmission patterns may include a set of candidate transmission patterns and a target transmission pattern which is selected or determined from the set of candidate transmission patterns. The set of candidate transmission patterns may include one or more of: downlink-centric transmission patterns mainly used for downlink data transmission, uplink-centric transmission patterns mainly used for uplink data transmission, downlink transmission patterns fully used for downlink transmission and/or uplink transmission patterns fully used for uplink data transmission.

Figure 2:
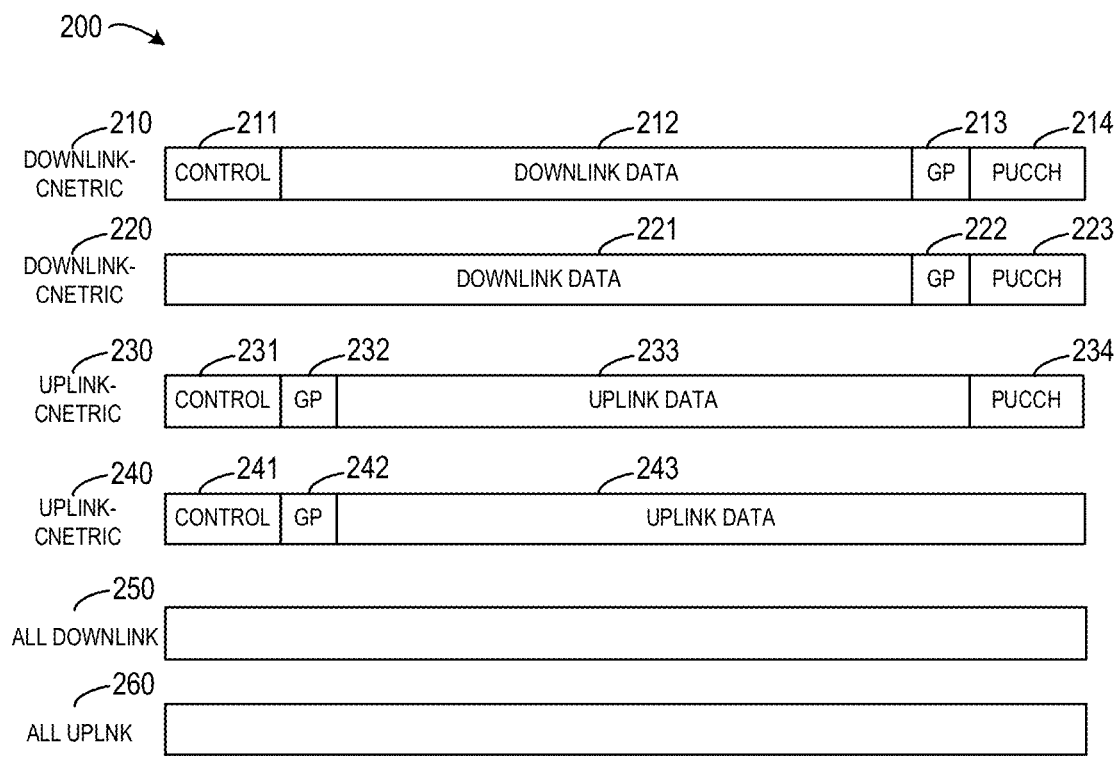
FIG. 2 illustrates a schematic diagram 200 of transmission patterns according to embodiments of the present disclosure.

FIG. 2 illustrates a diagram of different transmission patterns in accordance with embodiments of the present disclosure. As shown in FIG. 2, the downlink-centric transmission pattern 210 includes a downlink transmission part 211 for transmitting downlink control information, a downlink transmission part 212 for transmitting downlink data, a guard period (GP) part 213 and an uplink transmission part 214 (for example, Physical Uplink Control Channel (PUCCH)) for transmitting uplink control information. In the transmission pattern 210, the downlink transmission part 212 for transmitting the downlink data is longer than other parts, and thus it is called as a downlink-centric transmission pattern.

Similar to the downlink-centric transmission pattern 210, the downlink-centric transmission pattern 220 includes a downlink transmission part 221 for transmitting downlink data, a guard period (GP) part 222 and an uplink transmission part 223. The main difference between the downlink-centric transmission patterns 210 and 220 lies in that the transmission pattern 220 does not include a part for transmitting downlink control information.

The uplink-centric transmission pattern 230 includes a downlink transmission part 231 for transmitting downlink control information, a GP part 232, an uplink transmission part 233 for transmitting uplink data, and an uplink transmission part 234 (for example, PUCCH) for transmitting uplink control information. In the transmission pattern 230, the uplink transmission part 233 for transmitting the uplink data is longer than other parts, and thus the transmission pattern 230 is referred to as an uplink-centric transmission pattern.

Similar to the uplink-centric transmission pattern 230, the uplink-centric transmission pattern 240 includes a downlink transmission part 241 for transmitting downlink control information, a GP part 242 and an uplink transmission part 243 for transmitting uplink data. The main difference between the uplink-centric transmission patterns 230 and 240 lies in that the transmission pattern 240 does not include a part for transmitting uplink control information.

FIG. 2 also shows an all downlink transmission pattern 250 which is fully used for DL transmission, and an all uplink transmission pattern 260 which is fully used for UL transmission.

It is to be understood that, unless describing to the contrary, the term "transmission" or "communication" includes transmission or communication of control information and/or data, and the term "signal" used herein includes control information and/or data.

Conventionally, an indication about the transmission pattern may be included in downlink control information or higher layer signals. Then, the terminal device may have to spend a lot of time to decode the indication to determine what the transmission pattern is. However, this is not applicable for some types of communication, such as ultra-reliable and low latency communications.

Figure 3:
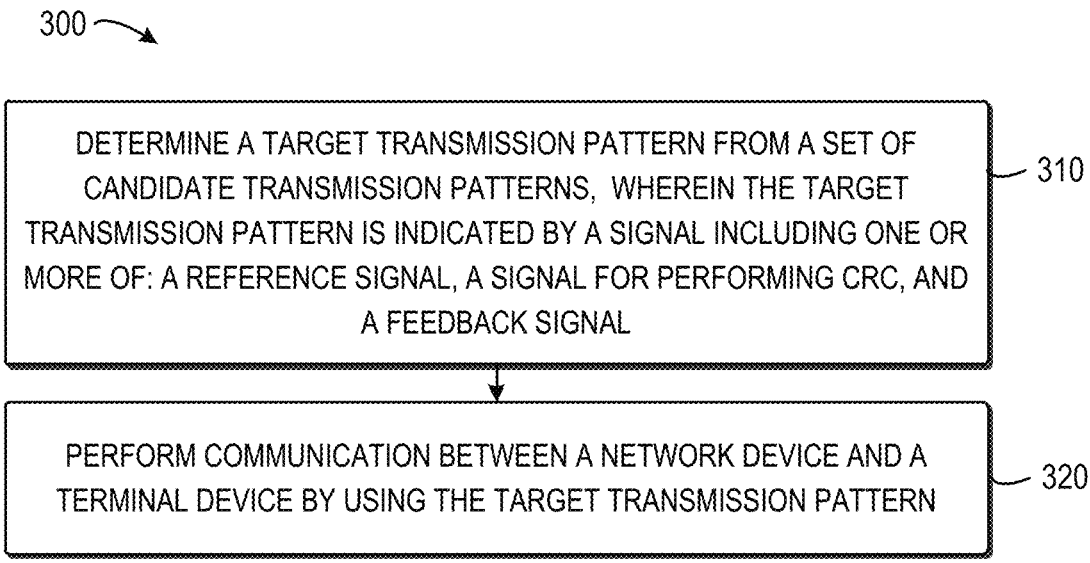
FIG. 3 illustrates a flow chart of a method 300 for performing communication according to embodiments of the present disclosure.

To solve this problem, embodiments of the present disclosure propose a solution as discussed below to indicate the transmission pattern in a more efficient way. Now some exemplary embodiments of the present disclosure will be described below with reference to the following figures. FIG. 3 illustrates a flow chart of a method 300 for performing communication according to embodiments of the present disclosure. The method 300 may be implemented by the BS 110, the terminal device 121, the terminal device 122 or other suitable device.

The method 300 is entered in block 310, where a target transmission pattern is determined from a set of candidate transmission patterns. The target transmission pattern is indicated by a signal including one or more of: a reference signal, a signal for performing CRC, and a feedback signal.

The reference signal is also referred to as a "RS" and may include, but not limited to, demodulation reference signal (DMRS), a channel state information reference signal (CSI-RS), a cell-specific reference signal (CRS), a sounding reference signal (SRS), and the like. In some embodiments, the target transmission pattern may be indicated by, for example, but not limited to, locations of the reference signal in frequency domain, locations of the reference signal in time domain, densities of the reference signal in frequency domain, densities of the reference signal in time domain, subcarrier spaces of the reference signal in frequency domain, symbol durations of the reference signal in time domain, a number of symbols of the reference signal in time domain, initial sequences for generating the reference signal, cyclic shifts of the reference signal, and/or the like.

The signal for performing CRC may include information related to the CRC, such as a mask, length, sequence of the CRC. By checking such a signal, a terminal device may perform CRC to know whether the transmission is correct. In some embodiments, the target transmission pattern may be indicated by one or more of mask of the signal for performing CRC, length of the signal for performing CRC, and whether the CRC is correct.

The feedback signal (also referred to as "feedback information" hereafter) may include, but not limited to, Acknowledgement (ACK) or Negative Acknowledgement (NACK). In some embodiments, the target transmission pattern may be indicated by locations of the feedback signal in time domain or frequency domain. For example, if the feedback signal is sent in a predefined location in either time domain or frequency domain, and if the location has been predefined for indicating a downlink-centric transmission pattern, it may be determined that the target transmission pattern is the downlink-centric transmission pattern.

In some embodiments, the method 300 may be performed by a network device, for example the BS 110 of FIG. 1. In such embodiments, the BS 110 may determine a target transmission pattern from the set of candidate transmission patterns for each of terminal devices (for example UEs 121 and 122) served by the network device, without requiring the target transmission pattern is the same for each of terminal devices.

In some embodiments, the method 300 may be performed by a terminal device, for example UE 121 or UE 122. In such embodiment, the UE 121 or 122 may determine a target transmission pattern that is suitable for transmitting signals between it and the BS 110.

In some embodiments, each of the candidate transmission patterns may contain a DL transmission part and/or an UL transmission part, and the candidate transmission patterns may differ from one another in terms of time durations and/or subcarrier spaces of the respective DL transmission parts and/or the UL transmission parts. In the embodiments, the signal transmitted in the target transmission pattern may indicate, but not limited to, one or more of: the time duration of the DL transmission part and/or the UL transmission part; the subcarrier space of the DL transmission part and/or the UL transmission part; a time duration of a guard period (GP) part between the DL transmission part and the UL transmission part; and whether there is communication on the DL transmission part or the UL transmission part.

As discussed above, the transmission pattern may correspond to one subframe or a certain number of symbols in time domain, and may correspond to one or more subcarriers in frequency domain. In embodiments of the present disclosure, the subcarrier space refers to a space between two subcarriers and is inversely proportional to a time duration of a symbol (also referred to as "symbol duration"). A symbol duration may be calculated according to the reciprocal of the subcarrier space. For example, if a subcarrier space is 15 kHz, the corresponding symbol duration may be 66.67 us.

Still referring to FIG. 3, in block 320, communication is performed between a network device and a terminal device by using the target transmission pattern. In some embodiments, when the network device (for example, the BS 110) determines the target transmission pattern for the terminal device (for example, the UE 122) in block 310, it may perform communication with the UE 122 by using the target transmission pattern. For instance, the BS 110 may send data to the UE 122 or receive data from the UE 122 according to the target transmission pattern.

Alternatively, when the terminal device (for example, the UE 122) determines the target transmission pattern in block 310, it may perform communication with the BS 110 by using the target transmission pattern. For instance, the UE 122 may send data to the BS 110 or receive data from the BS 110 according to the target transmission pattern.

In accordance with embodiments of the present disclosure, a variety of signals, such as, the RS, the signal for performing CRC, and the feedback signal may indicate one or more of the following of the target transmission pattern: whether the transmission duration of a part is empty or not, different numerology of respective parts, the different subframe types, different transmission intervals of respective parts, and so on.

Figure 4:
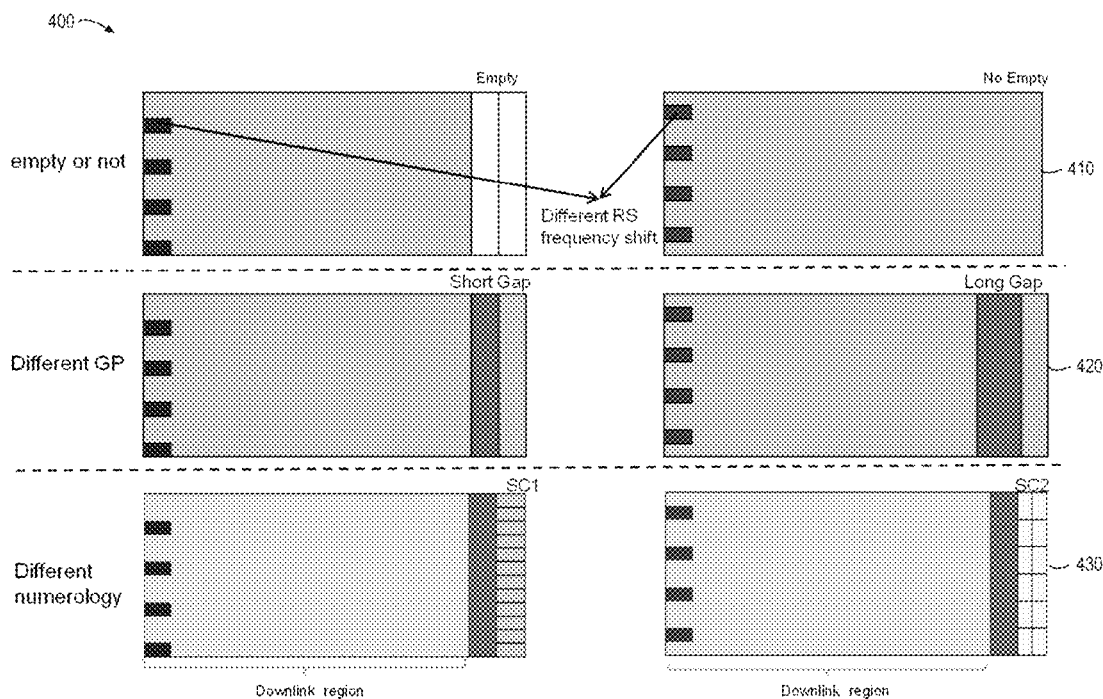
FIG. 4 illustrates a diagram 400 of RS indication according to embodiments of the present disclosure.

Some embodiments related to the indication are described as follows. FIG. 4 illustrates a diagram 400 of RS indication according to embodiments of the present disclosure. The RS indication represents an indication implemented through the RS. In the example of FIG. 4, it is shown, at 410, different frequency shifts of RS indicate whether the time duration of the UL transmission part is empty or not. At 420, different frequency shifts of RS indicate different time duration of GP. At 430, different frequency shifts of RS indicate different numerology of an UL transmission part (for example, PUCCH).

Figure 5A:
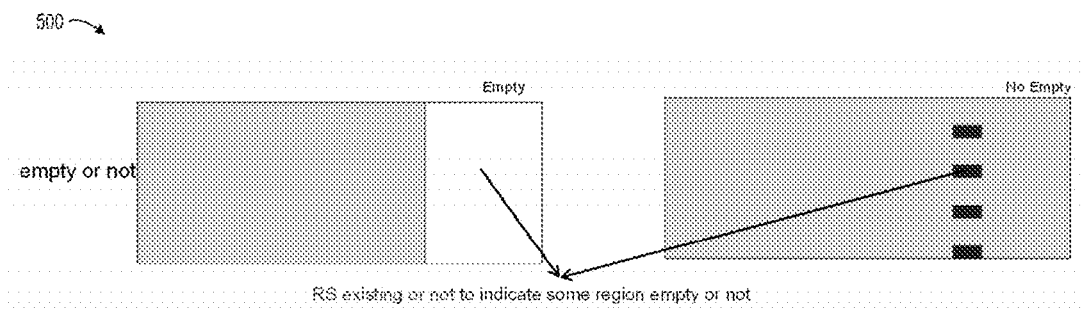
FIGS. 5A and 5B illustrate diagrams 500 and 550 of RS indication according to embodiments of the present disclosure, respectively.
Figure 5B:
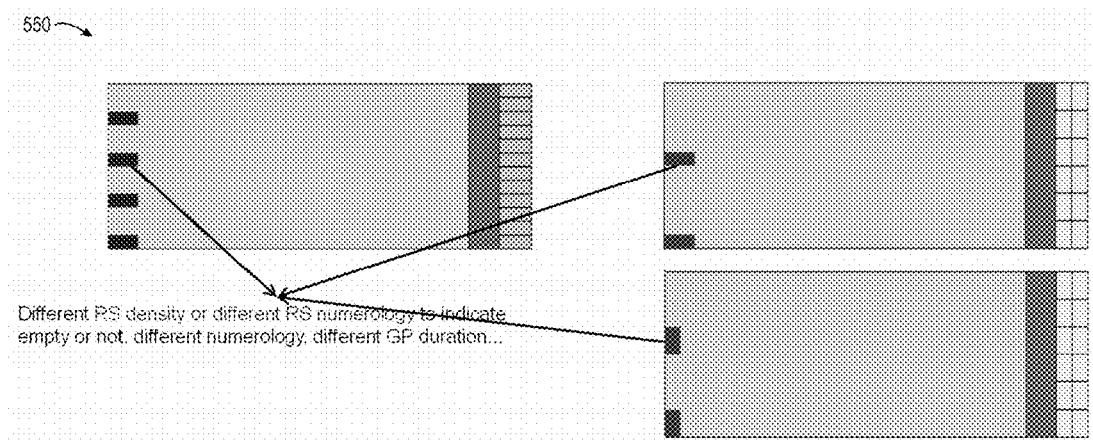

FIGS. 5A and 5B illustrate diagrams 500 and 550 of RS indication according to embodiments of the present disclosure. In the example of FIG. 5A, whether RS is exiting or not indicates whether the transmission duration of a part of the target transmission pattern is empty or not. In the example of FIG. 5B, different densities of the reference signal in time/frequency domain or different RS numerology indicate whether the transmission duration of a part of the target transmission pattern is empty or not, different numerology or time durations of respective parts of the target transmission pattern, the different subframe types, and so on.

Figure 6A:
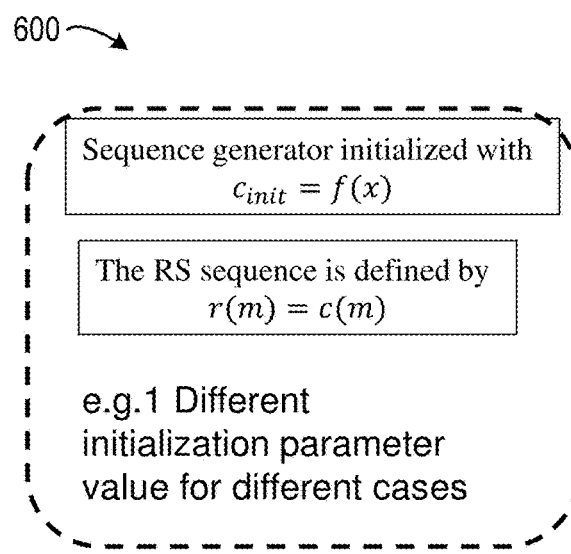
FIG. 6A-C illustrate diagrams 600, 610 and 620 of RS indication according to embodiments of the present disclosure, respectively.
Figure 6B:
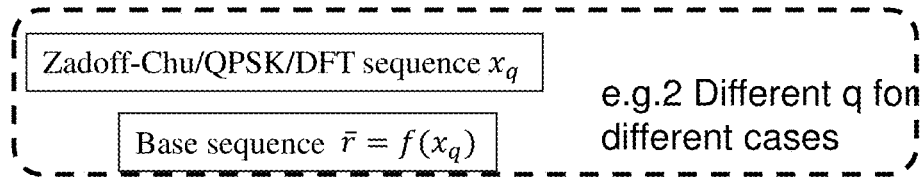
Figure 6C:
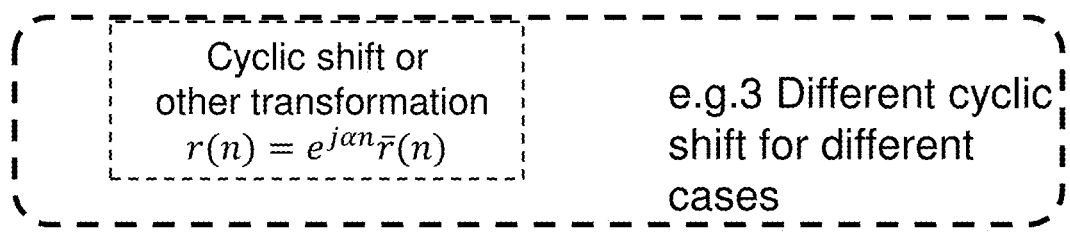

FIG. 6A-C illustrate diagrams 600, 610 and 620 of RS indication according to embodiments of the present disclosure, respectively. In the example of FIG. 6A, different initialization parameters correspond to different cases. The initialization parameters may be used to generate different RSs. Thus, the different initialization parameters may be used as an indication of the target transmission pattern.

In the example of FIG. 6B, initial sequences for generating the RS is obtained based on an initialization parameter q. With different q, the initialization sequences may be different and can be used as an indication of the target transmission pattern.

In the example of FIG. 6C, different cyclic shifts (CS) of the RS may be used as an indication of the target transmission pattern.

Figure 7:
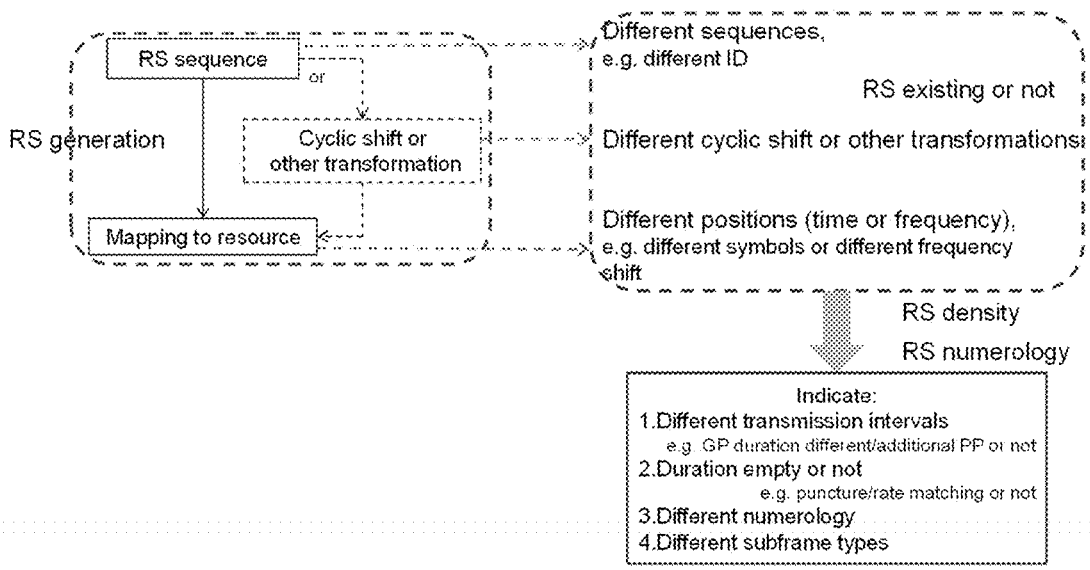
FIG. 7 illustrates a diagram 700 of RS indication according to embodiments of the present disclosure.

FIG. 7 illustrates a diagram 700 of RS indication according to embodiments of the present disclosure. In the example of FIG. 7, RS sequences or positions, different CS (or other transformation), RS densities, RS numerology, or whether the RS is existing may be used to indicate different transmission intervals, e.g. GP duration different/additional PP or not; whether a time duration is empty or not, e.g., whether puncture or rate matching or not; different numerology; different subframe types, and the like.

Figure 8:
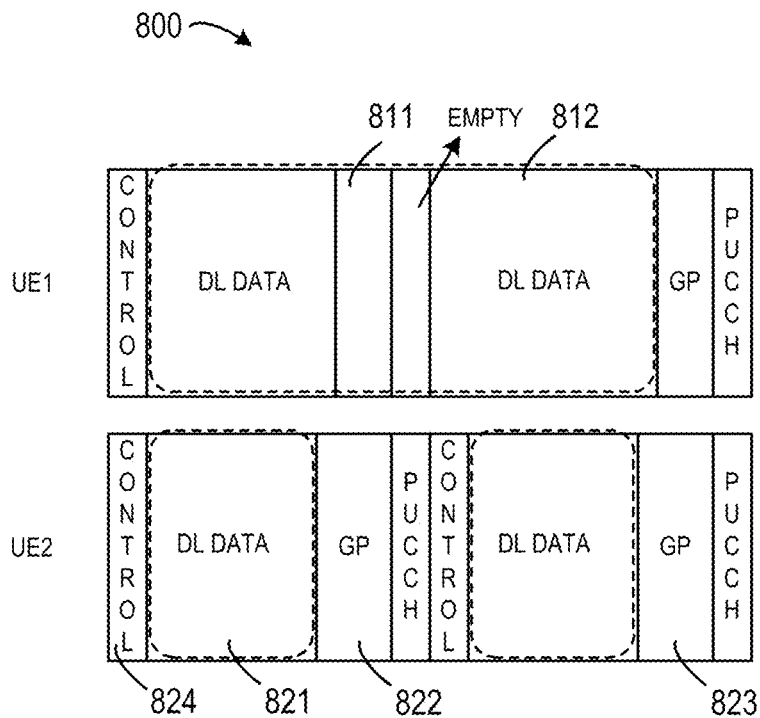
FIG. 8 illustrates a diagram 800 of transmission patterns for different terminal devices, UE1 and UE2, with respect to TDD and different GP durations according to embodiments of the present disclosure.

FIG. 8 illustrates a diagram 800 of transmission patterns for different terminal devices, UE1 and UE2, with respect to TDD and different GP durations according to embodiments of the present disclosure. In embodiments of the present disclosure, enhanced mobile broadband (eMBB) has a relatively loose requirement on user plane latency, for example, 4 ms for UL/DL transmission. Low latency communications (URLLC) requires relatively strict user plane latency, for example, 0.5 ms for UL/DL transmission. In the example of FIG. 8, the eMBB terminal device is referred to as UE1 and an ultra-reliable and the URLLC terminal device is referred to as UE2.

As to UE2, two transmission patterns are shown and they are the same. The DL transmission part 821 is for transmitting DL data and described as short downlink region including less symbols. In an embodiment, the number of symbols of the DL transmission part 821 may be indicated by DCI, which is included in another DL transmission part 828 for transmitting control information.

The GP 822 or 823 may be set as a long time duration if quick ACK/NACK feedback is required in the same transmission pattern, such that the GP can cover the sum of processing time, transmission advance (TA) for uplink transmission and transition time. As such, the UE2 may have enough time to process downlink data and transmit uplink with TA.

As to UE1, the GP may be set as a short time duration. For UE1 with multiple transmission pattern scheduling, it is possible that there is no processing time (only keep empty for the TA period align with UE2), so a shorter GP can be used when no PUCCH transmission in this transmission pattern. There is a shorter empty duration 811 with continuous scheduling to align with the time advance for UE1 PUCCH transmission. When multiple subframe scheduling is employed, if there is no DCI, UE1 MAY only monitor DCI in the first subframe, and skip control region in the following subframes (continuous downlink data transmission). If there is only compact DCI, UE1 may only monitor normal DCI in the first subframe, and compact DCI in the following subframes. In some alternative embodiments, the UE1 may monitor other DCI (still some DCI region reserved).

Figure 9:
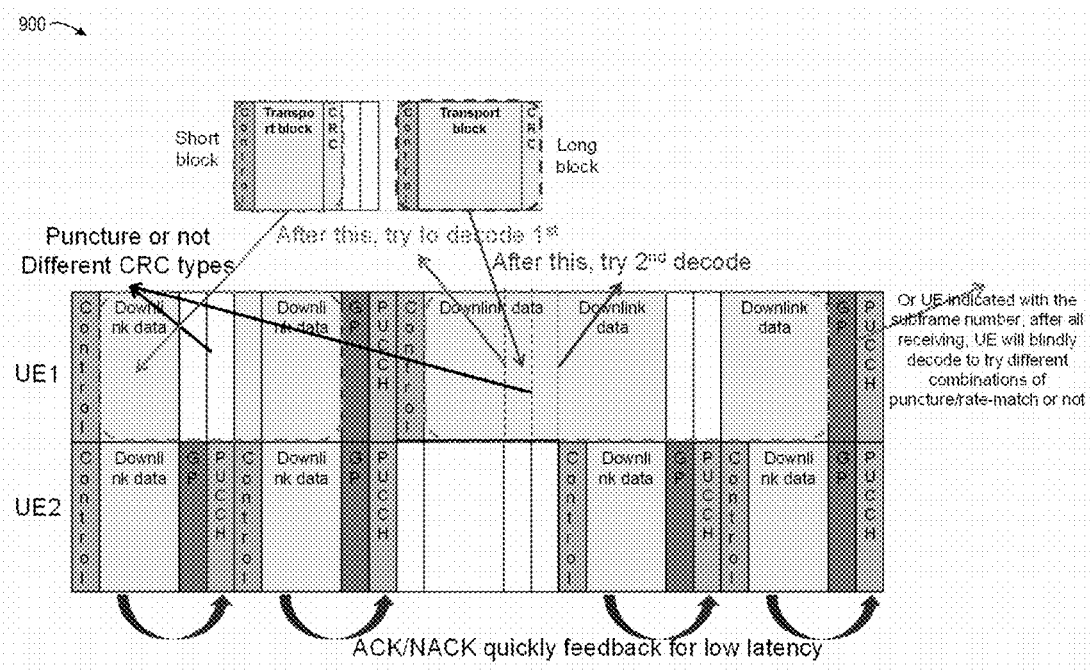
FIG. 9 illustrates a diagram 900 of CRC indication according to embodiments of the present disclosure.

FIG. 9 illustrates a diagram 900 of CRC indication according to embodiments of the present disclosure. For UE1, different CRC (for example, mask or length or position) may indicate different time durations of a part of the target transmission pattern. In one embodiment, the UE1 may check the CRC after a first receiving size. In embodiments of the present disclosure, the term "receiving size" may refer to the number of received symbols. Then the UE1 may check the CRC after a second receiving size, until find the correct receiving size. Thus, the UE1 may decode the data based on the correct receiving size.

In another embodiment, different CRC sequences which have, for example, different masks or different length are attached to the end of a transmission duration. The transmission duration includes one or more subframes for transmitting UL/DL data. In the example of FIG. 8, the transmission duration for UE1 is 2 subframes, and the transmission duration for UE2 includes 1 subframe. The different CRC sequences may indicate different transmission patterns, separately or in combination, in the transmission duration. The UE1 may receive at the whole transmission duration, and check the different CRC sequences, until find the correct one. And the UE1 may decode the data based on a transmission pattern corresponding to the correct CRC sequence.

In another embodiment, the UE1 may receive on the whole transmission duration, and perform blind decoding several times for different transmission patterns, until find the correct one.

Figure 10A:
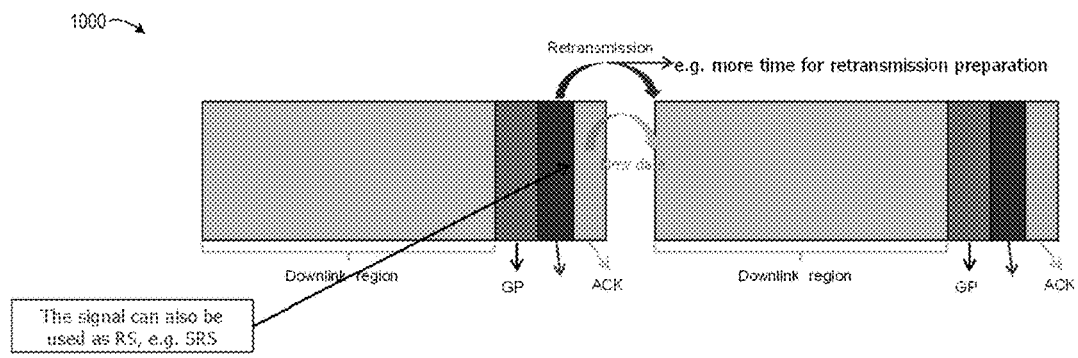
FIGS. 10A and 10B illustrate a diagram 1000 and 1050 of feedback signal indication according to embodiments of the present disclosure.
Figure 10B:
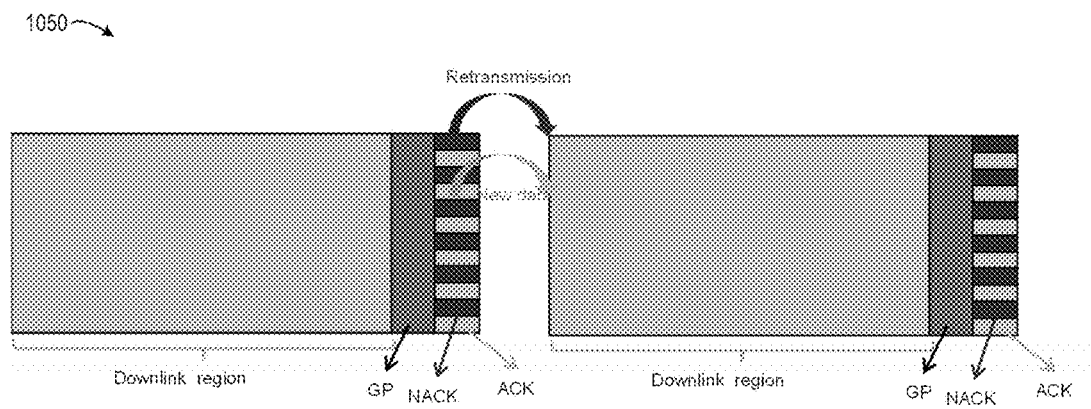

FIGS. 10A and 10B illustrate a diagram 1000 and 1050 of feedback signal indication according to embodiments of the present disclosure. In the embodiments illustrated by FIG. 10A, a feedback signal (ACK/NACK) is in different time positions. For example, a feedback signal of ACK is in one symbol, and a feedback signal of NACK is in another symbol. ACK/NACK may be implicitly indicated by the time position. The network device may detect the feedback signal at the time position, for example, by performing correlation without data demodulation. In the embodiments illustrated by FIG. 10B, a feedback signal (ACK/NACK) is in different frequency positions. For example, a feedback signal of ACK is in some subcarriers, for example, the even subcarriers, and a feedback signal of NACK is in some other subcarriers, for example, the odd subcarriers. ACK/NACK may be implicitly indicated by the frequency position. The network device may detect the feedback signal of ACK/NACK at the frequency position, for example, by performing correlation without data demodulation. In this way, ACK/NACK may be obtained in a faster way. In another embodiment, ACK/NACK may be indicated with the sequences or cyclic shift of the feedback signal. For example, ACK is indicated with one sequence or one cyclic shift of a basic signal, while NACK is indicated with a second sequence or a second cyclic shift of the basic signal.

Figure 11A:
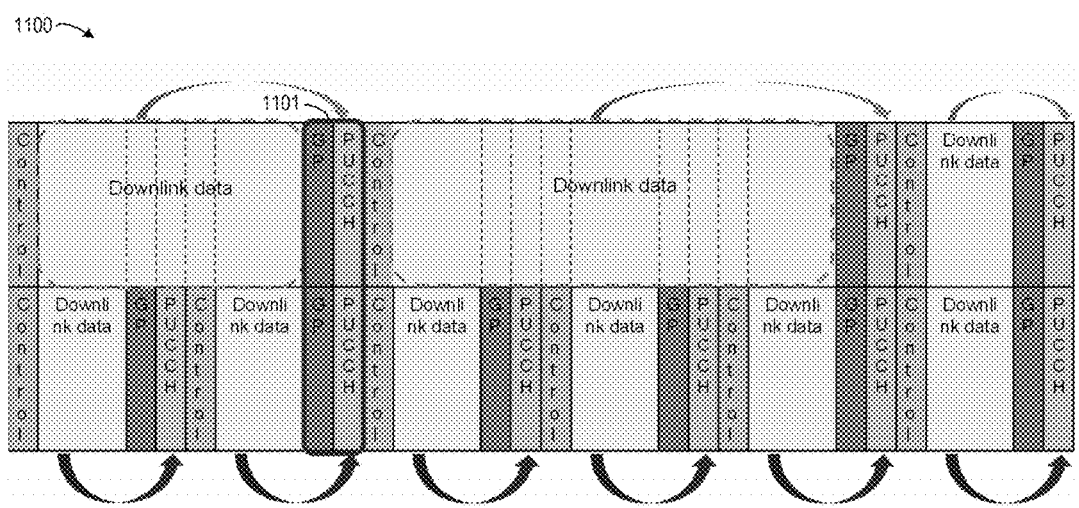
FIG. 11A illustrates a diagram 1100 of uplink transmission in DL band according to embodiments of the present disclosure.
Figure 11B:
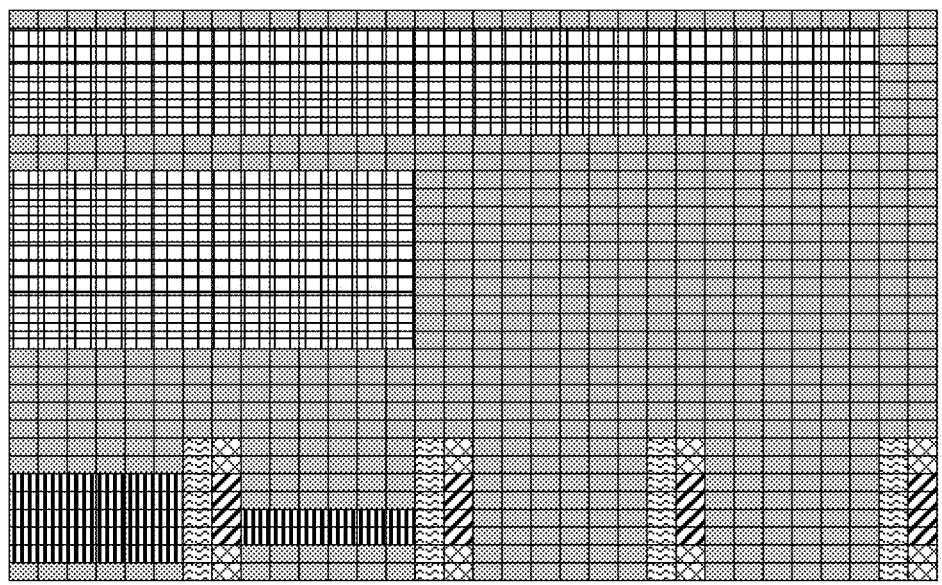
FIGS. 11B and 11C illustrate diagrams 1110 and 1120 of resource allocation of the uplink transmission in embodiments of FIG. 11A according to embodiments of the present disclosure, respectively.
Figure 11C:
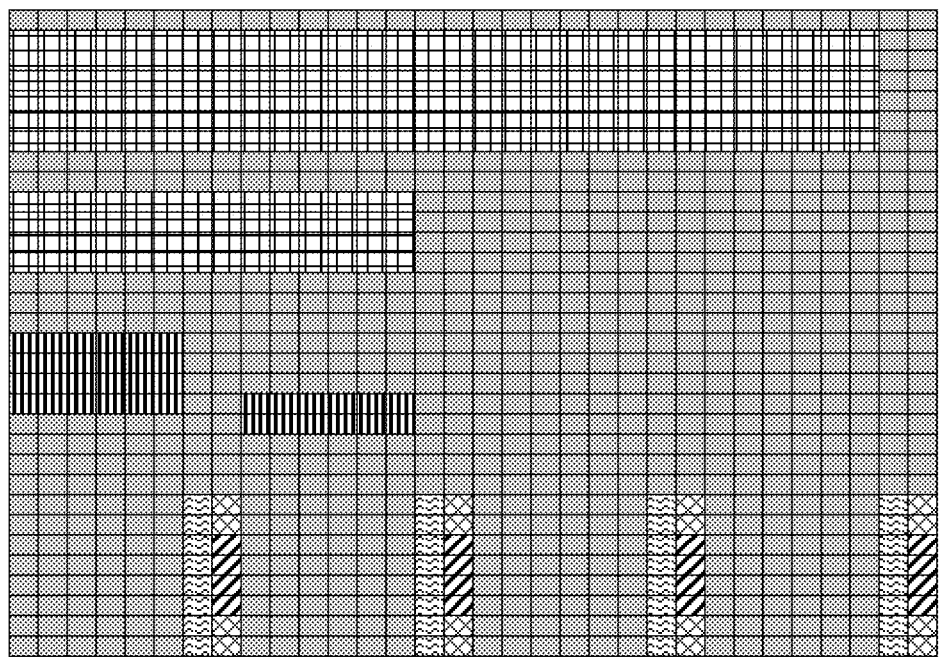

FIG. 11A illustrates a diagram 1100 of uplink transmission in DL band according to embodiments of the present disclosure. In the embodiments of FIG. 11A, as to frequency resource, PUCCH may be allocated with a certain number of frequency ranges in DL band. And a guard range is added at both two sides of the allocated frequency ranges. Other frequency resources may be scheduled as downlink resources for downlink transmission of other UEs. The part indicated by 1101 may be reported in frequency ranges allocated for PUCCH in DL band, or in UL band. In some embodiments, the frequency ranges allocated for PUCCH is indicated in control information transmitted in the DL transmission part, for example DCI, or radio resource control (RRC) signaling. In another embodiment, a set of frequency ranges allocated to a UE may be indicated in RRC, and one of the set of frequency ranges may be indicated in DCI. FIGS. 11B and 11C illustrate diagrams 1110 and 1120 of resource allocation of the part indicated by 1101 of FIG. 11A according to embodiments of the present disclosure, respectively.

Figure 12:
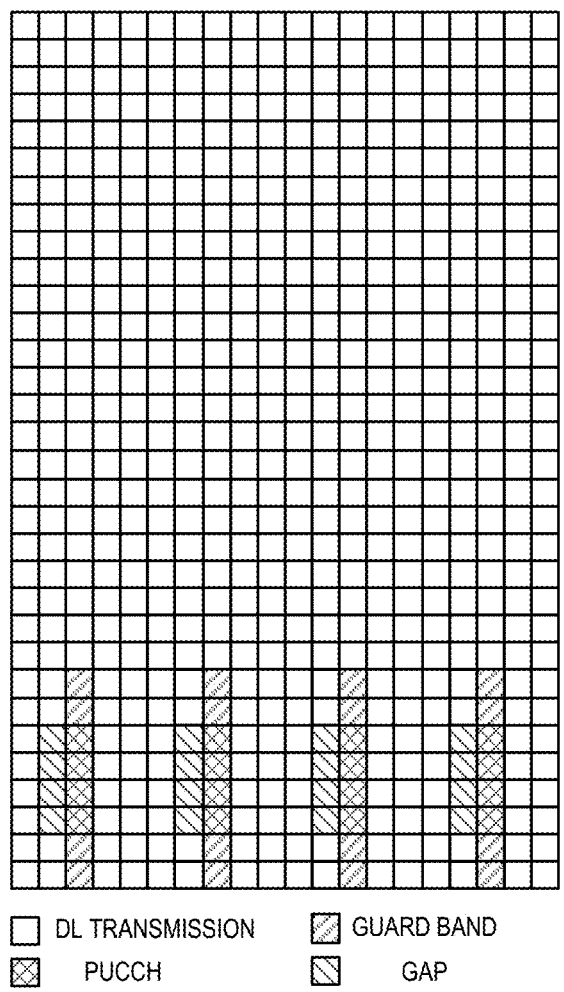
FIG. 12 illustrates a diagram 1200 of frequency resource configurations according to the above embodiments.

FIG. 12 illustrates a diagram 1200 of frequency resource configurations according to the above embodiments.

Figure 13:
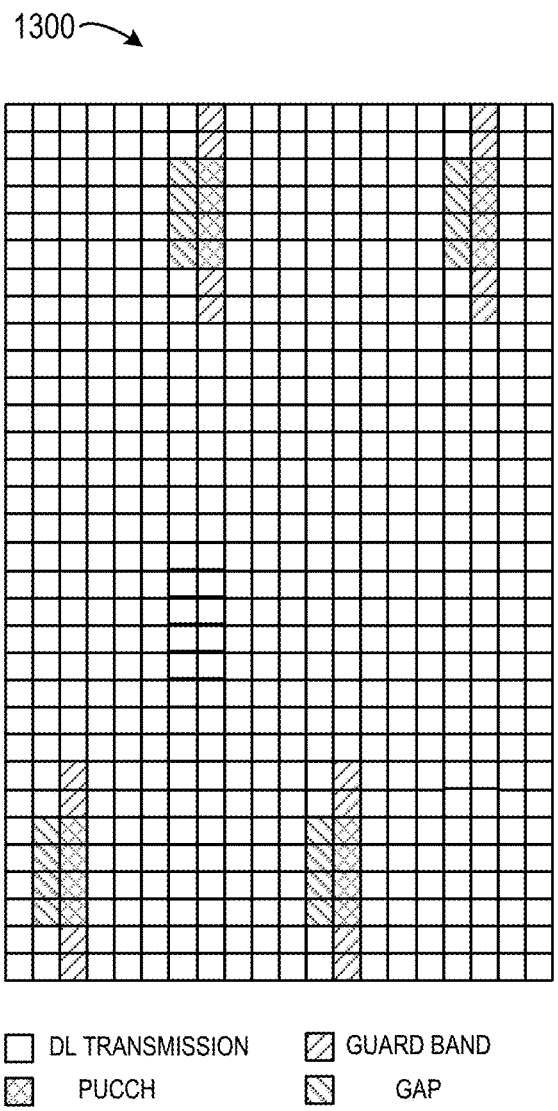
FIG. 13 illustrates another diagram 1300 of frequency resource configurations according to embodiments of the present disclosure.

FIG. 13 illustrates another diagram 1300 of frequency resource configurations according to embodiments of the present disclosure. In the example of FIG. 13, the frequency resource for PUCCH is hopping, which is different from the example of FIG. 12 (no hopping).

Figure 14:
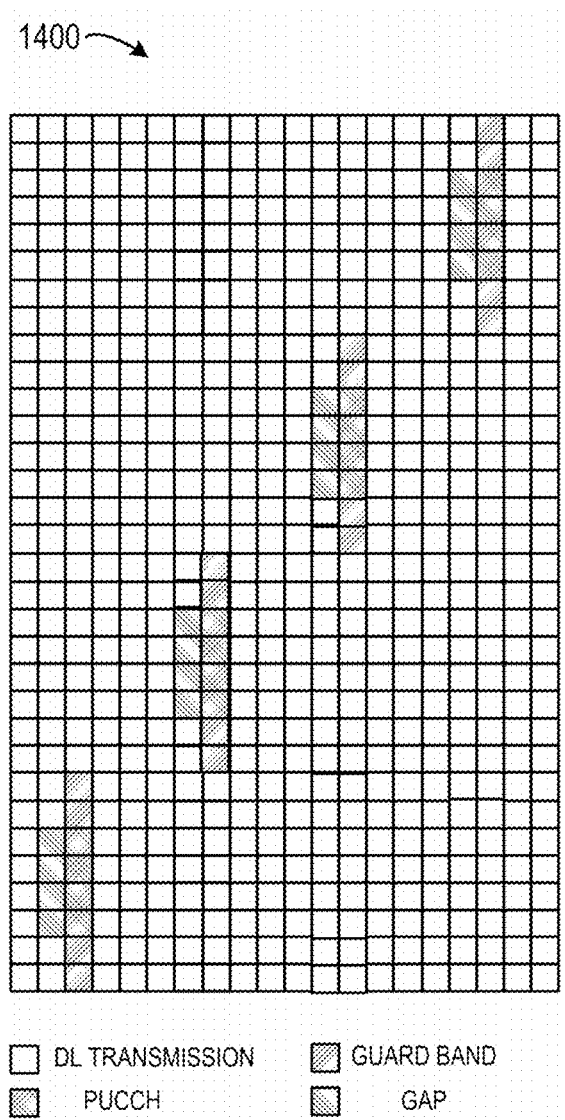
FIG. 14 illustrates yet another diagram 1400 of frequency resource configurations according to embodiments of the present disclosure.

FIG. 14 illustrates yet another diagram 1400 of frequency resource configurations according to embodiments of the present disclosure. In the example of FIG. 14, the frequency resource for PUCCH is cyclically allocated.

Figure 15:
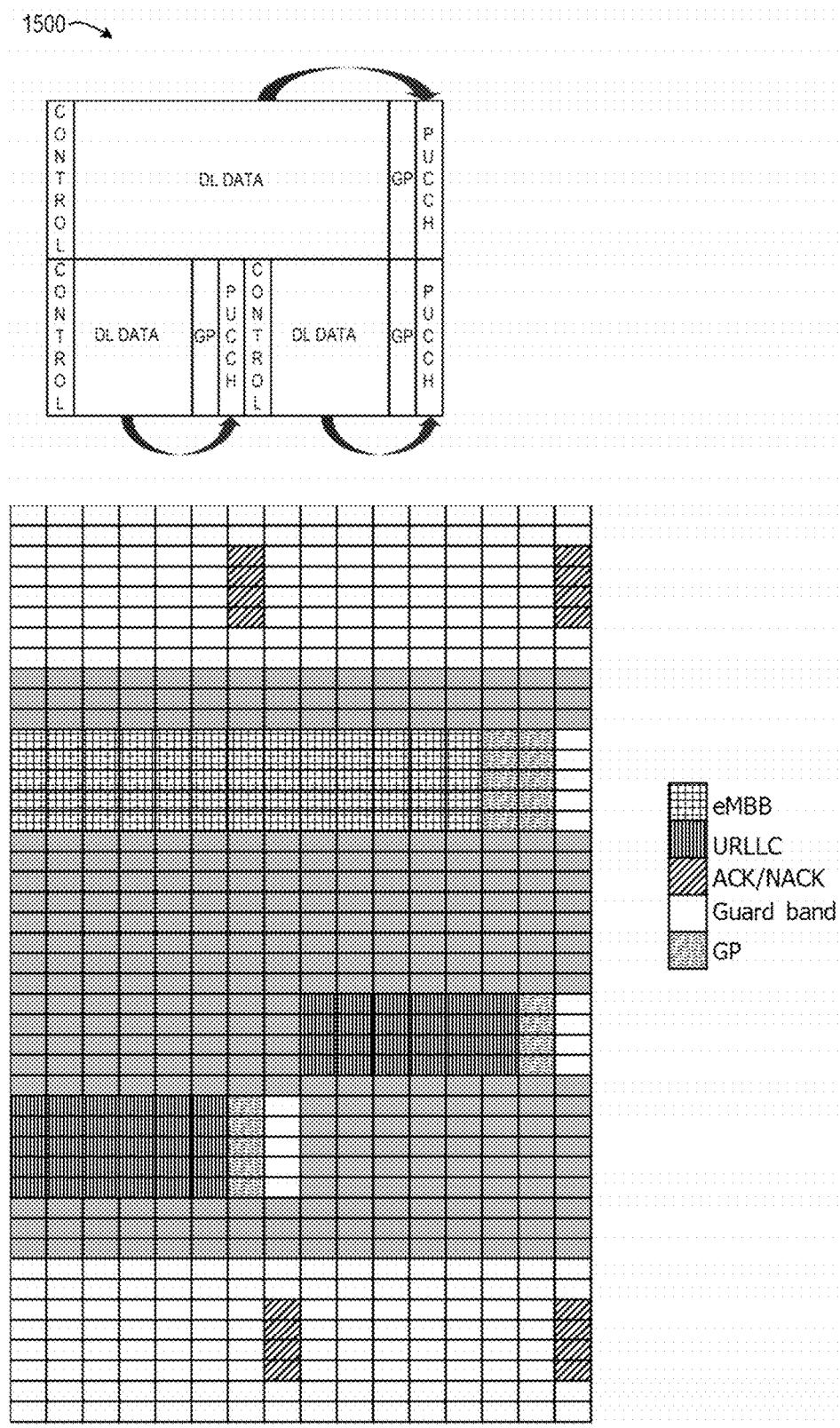
FIG. 15 illustrates a diagram 1500 of ACK/NACK in the guard band according to embodiments of the present disclosure.

FIG. 15 illustrates a diagram 1500 of ACK/NACK in the guard band of the DL band according to embodiments of the present disclosure. In the embodiments shown in FIG. 15, ACK/NACK may be reported in guard band, and the UE may have different scheduling time interval. In another embodiment, at the end of transmission, ACK/NACK may be reported in guard band, and GP may cover both a processing time and transmission advance (TA). For a long time interval UE (e.g. eMBB UE), the processing time is larger, so GP may have a relatively long time duration. In some embodiments, the frequency ranges allocated for ACK/NACK in guard band is indicated in control information transmitted in the DL transmission part, for example DCI, or radio resource control (RRC) signaling. In another embodiment, a set of frequency ranges allocated to a UE may be indicated in RRC, and one of the set of frequency ranges may be indicated in DCI.

Figure 16:
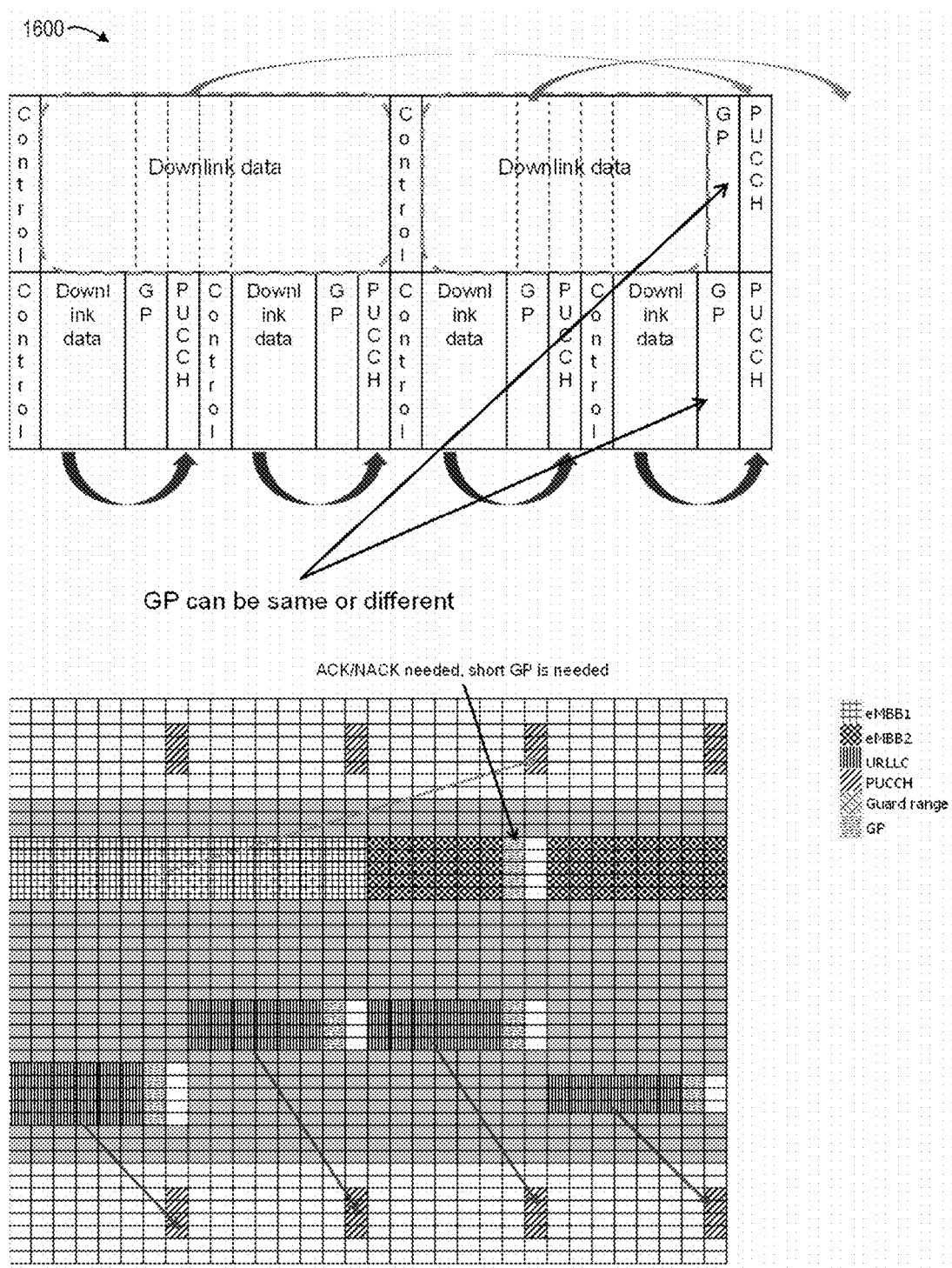
FIG. 16 illustrates a diagram 1600 of ACK/NACK in the guard band according to embodiments of the present disclosure.

FIG. 16 illustrates a diagram 1600 of ACK/NACK in the guard band according to embodiments of the present disclosure. In the embodiments shown in FIG. 16, ACK/NACK may be reported in guard band, UE can have different scheduling time interval. A long time interval UE (e.g. eMBB UE) may have different HARQ timing with a short time interval UE (e.g. URLLC UE).

For the short time interval UE, feedback may be performed in the same subframe, and may have a longer GP for processing and TA.

For the long time interval UE, feedback may be performed in n+k subframe. As to the subframe including ACK/NACK, a short GP may be needed for TA. On the other hand, if no ACK/NACK is needed, the subframe may not include a GP.

Figure 17:
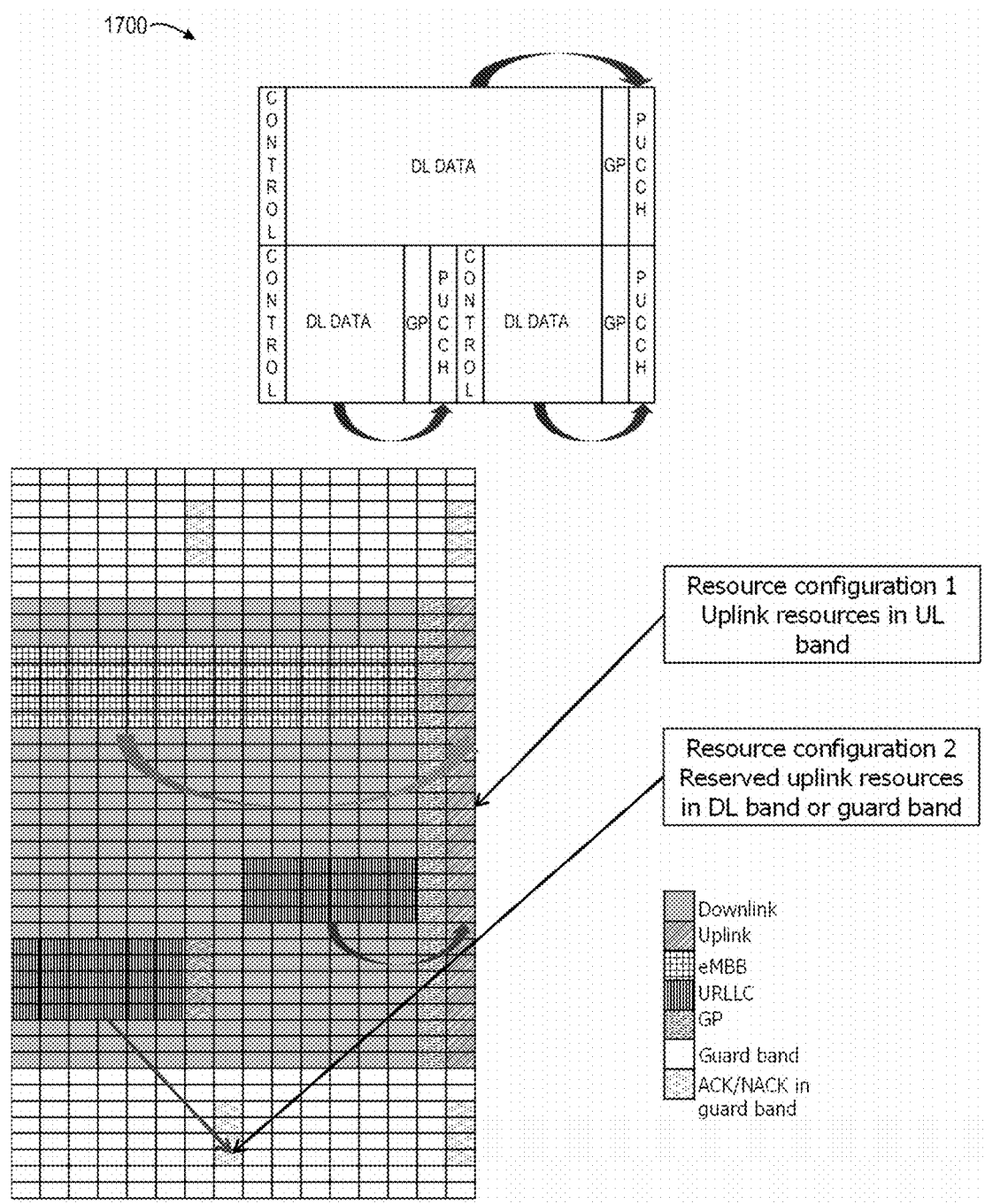
FIG. 17 illustrates a diagram 1700 of ACK/NACK in the guard band according to embodiments of the present disclosure.

FIG. 17 illustrates a diagram 1700 of ACK/NACK in the guard band according to embodiments of the present disclosure. In the embodiments shown in FIG. 17, there are different ACK/NACK resources for URLLC UE and eMBB UE. For example, the UL transmission part may be semi-statically configured. And for some UE, if there is a configured UL transmission part when ACK/NACK is needed to be reported, ACK/NACK may be transmitted in the UL transmission part according to resource configuration 1. Otherwise, if there is not a configured UL transmission part when ACK/NACK is needed to be reported, ACK/NACK may be reported in resource configuration 2 in downlink band (e.g. in guard band). For instance, the uplink transmission part may be semi-static semi-statically configured, or may be related to eMBB scheduling time (i.e. for ACK/NACK from an eMBB UE, there will be uplink resource and whether there is uplink resource or not is indicated to the URLLC UE).

Alternatively, as to the ACK/NACK of URLLC, it may be reported in the guard band or the allocated resource in DL band. As to the ACK/NACK of eMBB, there may be uplink resource configured.

Alternatively, all ACK/NACK may be reported in the guard band or the allocated resource in DL band.

Figure 18:
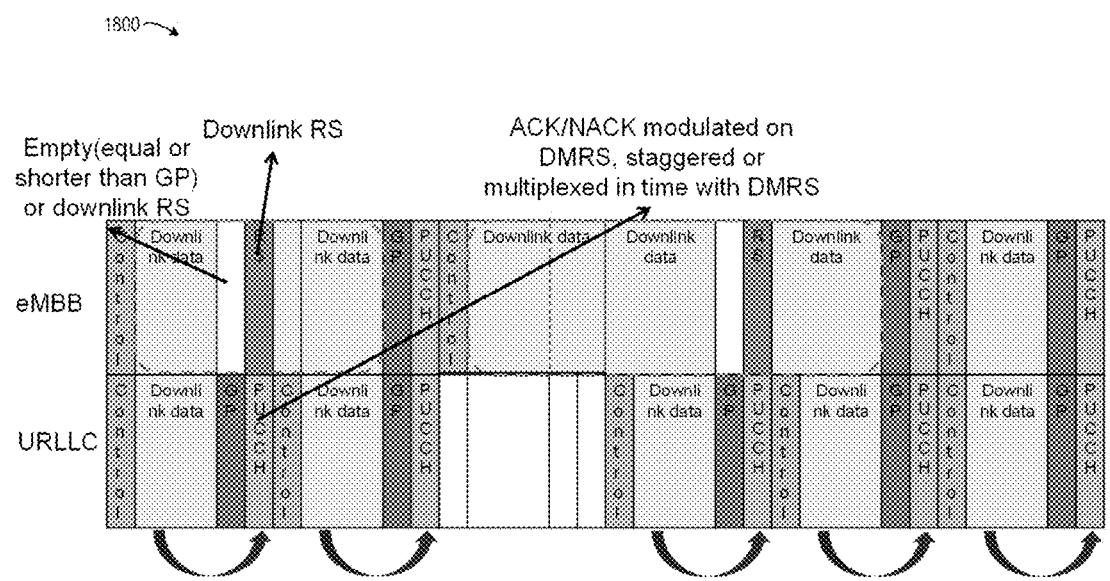
FIG. 18 illustrates a diagram 1800 of ACK/NACK in the allocated resource in DL band according to embodiments of the present disclosure.

FIG. 18 illustrates a diagram 1800 of ACK/NACK in the allocated resource in DL band according to embodiments of the present disclosure. In the embodiments shown in FIG. 18, for the eMBB multi-subframe scheduling, if multiplexed with URLLC, the eMBB UE may use GP and PUCCH regions to transmit downlink RS, and the URLLC UE may transmit ACK/NACK and DMRS (ACK/NACK modulated on DMRS). Uplink and downlink RS may have the same structure, so the interference can be eliminated with orthogonal or pseudo-random or cyclic shift of RS.

Figure 19:
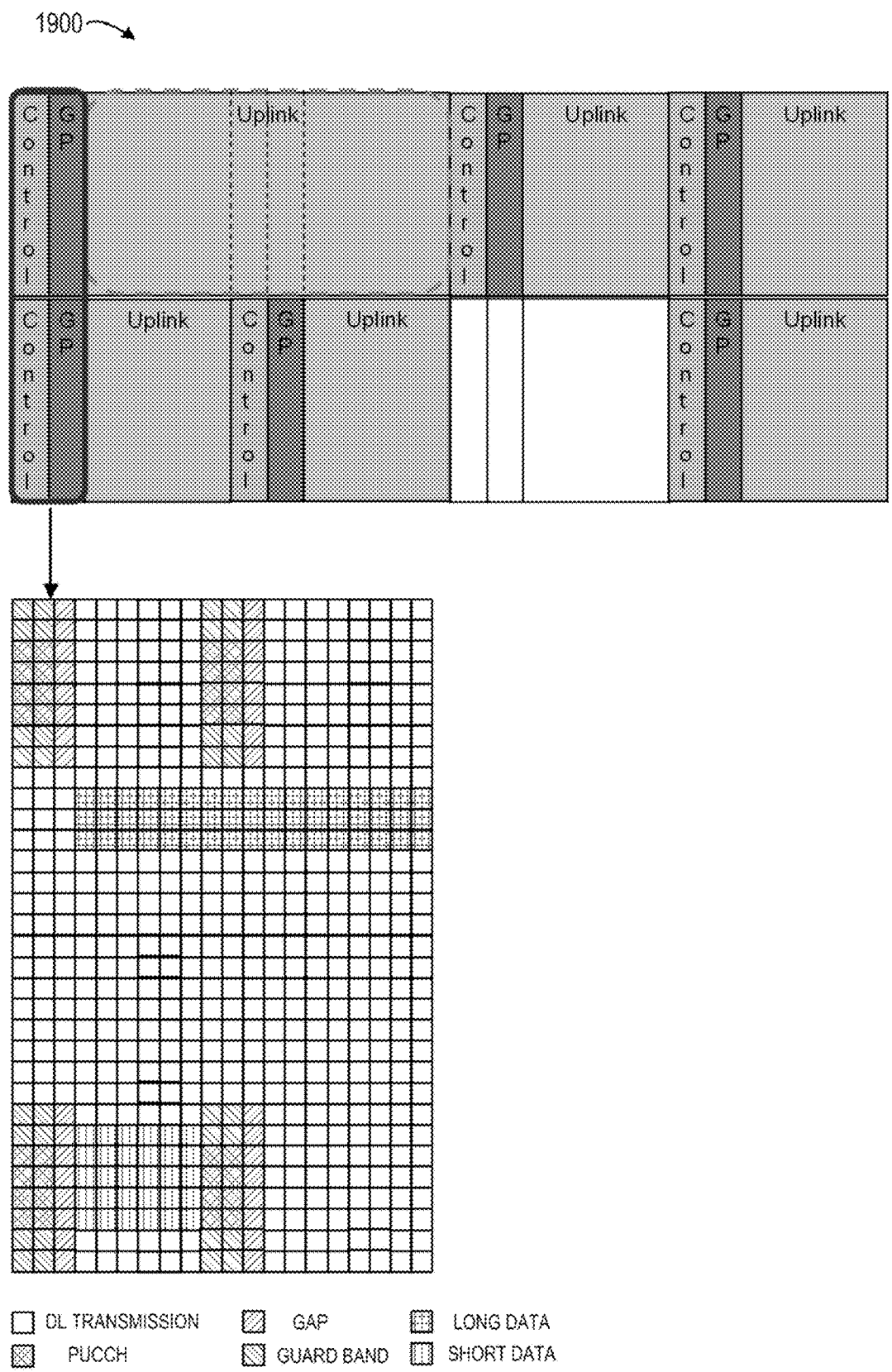
FIG. 19 illustrates a diagram 1900 of downlink transmission in UL band according to embodiments of the present disclosure.

FIG. 19 illustrates a diagram 1900 of downlink transmission in UL band according to embodiments of the present disclosure. In the embodiments shown in FIG. 19, PDCCH resources may be configured with a certain number of frequency ranges in the UL band. And a guard range may be located at both two sides of the configured frequency ranges. Other resources may be scheduled as uplink for other UEs. In some embodiments, the frequency ranges allocated for PDCCH is indicated in control information transmitted in the DL transmission part, for example DCI, or radio resource control (RRC) signaling. In another embodiment, a set of frequency ranges allocated to a UE may be indicated in RRC, and one of the set of frequency ranges may be indicated in DCI.

Figure 20:
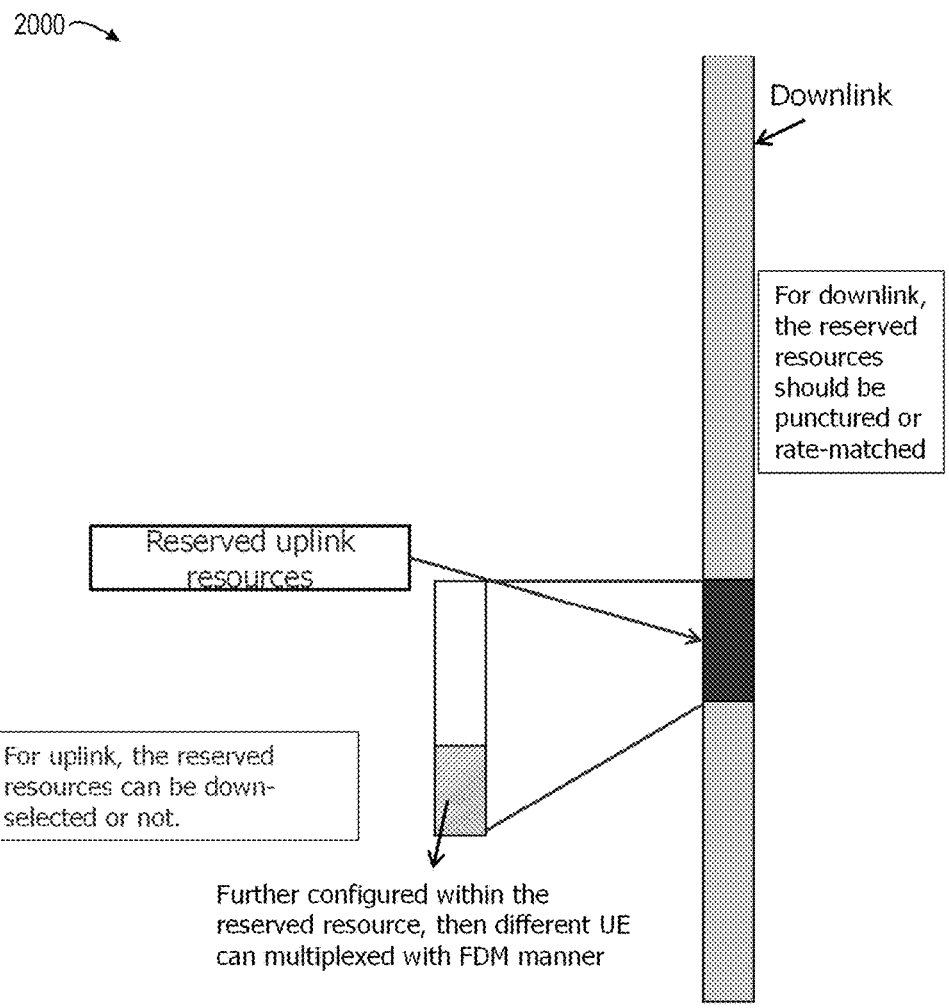
FIG. 20 illustrates a diagram 2000 of DL transmission according to embodiments of the present disclosure.

FIG. 20 illustrates a diagram 2000 of DL transmission according to embodiments of the present disclosure. In the embodiments shown in FIG. 20, resources may be configured for uplink transmission in downlink band, downlink transmission in uplink band, ACK/NACK transmission in guard band, and/or the like. For example, for uplink transmission in downlink band, eNB may configure some reserved resources for the uplink transmission. If allocated downlink resource collides with the reserved resources, the downlink transmission may be punctured or rate matched. In another embodiment, for the uplink transmission, there may be two-stage resources configuration. That is, within the reserved resources, the UE may be further configured with some part of the resources. There may be different uplink transmission types, e.g. one is uplink transmission in downlink (the resources are configured), and another one may be uplink transmission in uplink interval. For instance, if two uplink transmission types collide, uplink transmission may be performed in uplink time interval.

Figure 21:
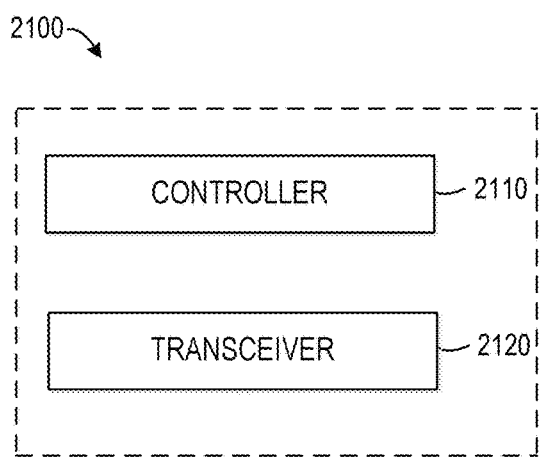
FIG. 21 illustrates a schematic diagram of a device 2100 according to an embodiment of the present disclosure.

FIG. 21 illustrates a schematic diagram of a device 2100 according to an embodiment of the present disclosure. According to embodiments of the present disclosure, the device 2100 may be implemented at a network device, such as the BS 110, a terminal device, such as the UE 121 or 122, or other suitable device in the communication system.

As shown in FIG. 21, the device 2100 comprises: a controller 2110 configured to determine a target transmission pattern from a set of candidate transmission patterns, wherein the target transmission pattern is indicated by a signal including one or more of: a reference signal, a signal for performing Cyclic Redundancy Check (CRC), and a feedback signal; and a transceiver 2120 configured to perform communication between a network device and a terminal device by using the target transmission pattern.

In an embodiment, the target transmission pattern may be indicated by one or more of: locations of the reference signal in frequency domain, locations of the reference signal in time domain, densities of the reference signal in frequency domain, densities of the reference signal in time domain, subcarrier spaces of the reference signal in frequency domain, symbol durations of the reference signal in time domain, a number of symbols of the reference signal in time domain, initialization parameters or initialization sequences for generating the reference signal, and cyclic shifts of the reference signal.

In an embodiment, the target transmission pattern may be indicated by one or more of: mask of the signal for performing CRC, length of the signal for performing CRC, and whether the CRC is correct.

In an embodiment, the feedback signal may be Acknowledgement (ACK) or Negative Acknowledgement (NACK), and the target transmission pattern may be indicated by locations of the feedback signal in time domain or frequency domain.

In an embodiment, each of the candidate transmission patterns may contain a DL transmission part and/or a UL transmission part, and the candidate transmission patterns may differ from one another in terms of time durations and/or subcarrier spaces of the respective DL transmission parts and/or the UL transmission parts.

In an embodiment, the signal transmitted in the target transmission pattern may indicate one or more of: the time duration of the DL transmission part and/or the UL transmission part; the subcarrier space of the DL transmission part and/or the UL transmission part; a time duration of a GP part between the DL transmission part and the UL transmission part; and whether there is communication on the DL transmission part or the UL transmission part.

In an embodiment, the controller 2110 may be further configured to determine, at the network device, a target transmission pattern from the set of candidate transmission patterns for each of terminal devices served by the network device, without requiring the target transmission pattern is the same for each of the terminal devices.

Embodiments of the present disclosure also provided an apparatus implemented at a network device or a terminal device. The apparatus may include means for determining a target transmission pattern from a set of candidate transmission patterns, wherein the target transmission pattern is indicated by a signal including one or more of: a reference signal, a signal for performing Cyclic Redundancy Check (CRC), and a feedback signal; and means for performing communication between a network device and a terminal device by using the target transmission pattern.

It is also to be noted that the device 2100 may be respectively implemented by any suitable technique either known at present or developed in the future. Further, a single device shown in FIG. 21 may be alternatively implemented in multiple devices separately, and multiple separated devices may be implemented in a single device. The scope of the present disclosure is not limited in these regards.

It is noted that the device 2100 may be configured to implement functionalities as described with reference to FIGS. 3-20. Therefore, the features discussed with respect to the method 300 may apply to the corresponding components of the device 2100. It is further noted that the components of the device 2100 may be embodied in hardware, software, firmware, and/or any combination thereof. For example, the components of the device 2100 may be respectively implemented by a circuit, a processor or any other appropriate device. Those skilled in the art will appreciate that the aforesaid examples are only for illustration not limitation.

In some embodiment of the present disclosure, the device 2100 may comprise at least one processor. The at least one processor suitable for use with embodiments of the present disclosure may include, by way of example, both general and special purpose processors already known or developed in the future. The device 2100 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the device 2100 to at least perform according to the method 300 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 3 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a device, comprising:
   determining a target transmission pattern from a set of candidate transmission patterns, the target transmission pattern being indicated by a signal and one of the set of candidate transmission patterns comprising a downlink part and an uplink part;
   receiving an indication related to a rate match from a network device, the received indication indicating that a resource in the downlink part of the determined target pattern is not for a downlink transmission to the device; and
   performing communication with the network device based on the target transmission pattern and the received indication.

2. The method according to claim 1, wherein the signal is a reference signal, and wherein the target transmission pattern is indicated by one or more of:
   locations of the reference signal in frequency domain,
   locations of the reference signal in time domain,
   densities of the reference signal in frequency domain,
   densities of the reference signal in time domain,
   subcarrier spaces of the reference signal in frequency domain,
   symbol durations of the reference signal in time domain,
   a number of symbols of the reference signal in time domain,
   initialization parameters or initialization sequences for generating the reference signal, and
   cyclic shifts of the reference signal.

3. The method according to claim 1, wherein the signal is a signal for performing Cyclic Redundancy Check (CRC) and wherein the target transmission pattern is indicated by one or more of:
   mask of the signal for performing CRC,
   length of the signal for performing CRC, and
   whether the CRC is correct.

4. The method according to claim 1, wherein the signal is a feedback signal,
   wherein the feedback signal is Acknowledgement (ACK) or Negative Acknowledgement (NACK), and
   wherein the target transmission pattern is indicated by locations of the feedback signal in time domain or frequency domain.

5. The method according to claim 1, wherein each of the candidate transmission patterns contains a downlink (DL) transmission part and/or an uplink (UL) transmission part, and the candidate transmission patterns differ from one another in terms of time durations and/or subcarrier spaces of the respective DL transmission parts and/or the UL transmission parts.

6. The method according to claim 5, wherein the signal transmitted in the target transmission pattern indicates one or more of:
   the time duration of the DL transmission part and/or the UL transmission part;
   the subcarrier space of the DL transmission part and/or the UL transmission part;
   a time duration of a guard period (GP) part between the DL transmission part and the UL transmission part; and
   whether there is communication on the DL transmission part or the UL transmission part.

7. The method according to claim 1, wherein the target transmission pattern is from the set of candidate transmission patterns for each of terminal devices served by the network device, without requiring the target transmission pattern be same for each of the terminal devices.

8. The method according to claim 1, wherein each of the candidate transmission patterns indicate a unique pattern corresponding to different transmission duration or time interval in time domain.

9. The method according to claim 1, wherein each of the candidate transmission patterns indicate a unique pattern corresponding to different numerologies.

10. The method according to claim 1, wherein each of the candidate transmission patterns indicate a unique pattern corresponding to different subcarrier spaces in frequency domain.

11. The method according to claim 1, wherein the signal is a reference signal in a data portion of a downlink region.

12. The method according to claim 1, wherein the signal is a Cyclic Redundancy Check (CRC) in a data portion of a downlink region.

13. The method according to claim 1, wherein the signal is a feedback signal or a guard period after a data portion of a downlink region.

14. A device for performing communication, comprising:
a controller configured to:
determine a target transmission pattern from a set of candidate transmission patterns, the target transmission pattern being indicated by a signal and one of the set of candidate transmission patterns comprising a downlink part and an uplink part, and
receive an indication related to a rate match from a network device, the received indication indicating that a resource in the downlink part of the determined target pattern is not for a downlink transmission to the device; and
a transceiver configured to perform communication with the network device based on the target transmission pattern and the received indication.

15. The device according to claim 14, wherein the signal is a reference signal, and wherein the target transmission pattern is indicated by one or more of:
locations of the reference signal in frequency domain,
locations of the reference signal in time domain,
densities of the reference signal in frequency domain,
densities of the reference signal in time domain,
subcarrier spaces of the reference signal in frequency domain,
symbol durations of the reference signal in time domain,
a number of symbols of the reference signal in time domain,
initialization parameters or initialization sequences for generating the reference signal, and
cyclic shifts of the reference signal.

16. The device according to claim 14, wherein the signal is a signal for performing Cyclic Redundancy Check (CRC) and wherein the target transmission pattern is indicated by one or more of:
mask of the signal for performing CRC,
length of the signal for performing CRC, and
whether the CRC is correct.

17. The device according to claim 14, wherein the signal is a feedback signal,
wherein the feedback signal is Acknowledgement (ACK) or Negative Acknowledgement (NACK), and
wherein the target transmission pattern is indicated by locations of the feedback signal in time domain or frequency domain.

18. The device according to claim 14, wherein each of the candidate transmission patterns contains a downlink (DL) transmission part and/or an uplink (UL) transmission part, and the candidate transmission patterns differ from one another in terms of time durations and/or subcarrier spaces of the respective DL transmission parts and/or the UL transmission parts.

19. The device according to claim 5, wherein the signal transmitted in the target transmission pattern indicates one or more of:
the time duration of the DL transmission part and/or the UL transmission part;
the subcarrier space of the DL transmission part and/or the UL transmission part;
a time duration of a guard period (GP) part between the DL transmission part and the UL transmission part; and
whether there is communication on the DL transmission part or the UL transmission part.

20. The device according to claim 14, wherein the target transmission pattern is from the set of candidate transmission patterns for each of terminal devices served by the network device, without requiring the target transmission pattern be same for each of the terminal devices.

* * * * *